United States Patent
Yamahara

(10) Patent No.: US 10,346,021 B2
(45) Date of Patent: Jul. 9, 2019

(54) AUTOMATIC LIST SCROLLING APPARATUS, METHOD AND PROGRAM BASED ON A SELECTED ITEM

(71) Applicant: Rakuten, Inc., Tokyo (JP)

(72) Inventor: Hisanori Yamahara, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 271 days.

(21) Appl. No.: 14/893,298

(22) PCT Filed: May 29, 2013

(86) PCT No.: PCT/JP2013/064867
§ 371 (c)(1),
(2) Date: Nov. 23, 2015

(87) PCT Pub. No.: WO2014/192092
PCT Pub. Date: Dec. 4, 2014

(65) Prior Publication Data
US 2016/0124598 A1    May 5, 2016

(51) Int. Cl.
G06F 3/0485 (2013.01)
G06F 3/0482 (2013.01)
G06F 3/0488 (2013.01)

(52) U.S. Cl.
CPC .......... *G06F 3/0485* (2013.01); *G06F 3/0482* (2013.01); *G06F 3/0488* (2013.01)

(58) Field of Classification Search
CPC ..... G06F 3/0485; G06F 3/0482; G06F 3/0488
See application file for complete search history.

(56) References Cited

U.S. PATENT DOCUMENTS 5,196,838 A * 3/1993 Meier ................. G06F 3/04812
                                                    345/684
6,928,623 B1 * 8/2005 Sibert .................... G06F 3/0481
                                                    715/783
(Continued)

FOREIGN PATENT DOCUMENTS

JP          2012-18468 A        1/2012

OTHER PUBLICATIONS

Aliakseyeu et al. (http://hci.cs.umanitoba.ca/assets/publication_files/2008-CHI-Aliakseyeu-MultiFlick.pdf; pub date: Apr. 2008; last accessed Sep. 25, 2017) (hereinafter Aliakseyeu).*

(Continued)

*Primary Examiner* — Jung-Mu T Chuang
(74) *Attorney, Agent, or Firm* — Sughrue Mion, PLLC

(57) ABSTRACT

An information processing apparatus causes some of a plurality of items to be listed in a display area. The information processing apparatus receives an operation to cause at least one of items not being displayed in the display area, among the plurality of items, to be displayed in the display area. The information processing apparatus receives an operation to select one item from among the items displayed in the display area. The information processing apparatus causes a predetermined process corresponding to the operation to be performed for a selected first item and causes items to be arranged in the display area so that the first item or a second item arranged just before the first item among the plurality of items is the item arranged foremost among the items listed in the display area.

12 Claims, 11 Drawing Sheets

(56) References Cited

U.S. PATENT DOCUMENTS

| | | | | |
|---|---|---|---|---|
| 7,061,474 B2* | 6/2006 | Hinckley | G06F 3/03547 | 345/173 |
| 7,249,325 B1* | 7/2007 | Donaldson | G06F 3/03547 | 345/169 |
| 7,631,276 B2* | 12/2009 | Gruen | G06F 3/0482 | 715/818 |
| 7,805,684 B2* | 9/2010 | Arvilommi | G06F 3/0482 | 715/829 |
| 8,429,521 B2* | 4/2013 | Lloyd | G06F 17/246 | 715/212 |
| 8,438,496 B1* | 5/2013 | Hegde | G06F 3/0485 | 715/784 |
| 8,587,521 B2* | 11/2013 | Zielke | G06F 3/03543 | 345/159 |
| 9,123,070 B2* | 9/2015 | Lin-Hendel | G06F 3/0482 | |
| 9,383,910 B2* | 7/2016 | Hanumara | G06F 3/0481 | |
| 9,740,381 B1* | 8/2017 | Chaudhri | G06F 3/04845 | |
| 9,753,541 B1* | 9/2017 | Robert | G06F 3/016 | |
| 9,910,580 B2* | 3/2018 | Fang | G06F 3/0485 | |
| 9,922,624 B2* | 3/2018 | Pascucci | G06F 3/0383 | |
| 9,978,043 B2* | 5/2018 | Jon | G06Q 10/1095 | |
| 2003/0043123 A1* | 3/2003 | Hinckley | G06F 3/021 | 345/173 |
| 2003/0043174 A1* | 3/2003 | Hinckley | G06F 3/03547 | 345/684 |
| 2005/0022140 A1* | 1/2005 | Vale | G06F 3/0481 | 715/864 |
| 2005/0144568 A1* | 6/2005 | Gruen | G06F 3/0482 | 715/822 |
| 2007/0022159 A1* | 1/2007 | Zhu | H04L 12/1831 | 709/204 |
| 2007/0198935 A1* | 8/2007 | Constantine | G06F 3/0485 | 715/744 |
| 2008/0059908 A1* | 3/2008 | Arvilommi | G06F 3/0482 | 715/841 |
| 2008/0068340 A1* | 3/2008 | Landschaft | G06F 3/0485 | 345/169 |
| 2008/0102434 A1* | 5/2008 | Rogers | G09B 5/00 | 434/350 |
| 2008/0133487 A1* | 6/2008 | Gross | G06F 17/30864 | |
| 2008/0140655 A1* | 6/2008 | Hoos | G06F 17/30994 | |
| 2011/0013087 A1* | 1/2011 | House | A63B 24/0021 | 348/564 |
| 2011/0119714 A1* | 5/2011 | Murthy | H04N 21/4312 | 725/52 |
| 2011/0307772 A1* | 12/2011 | Lloyd | G06F 17/246 | 715/212 |
| 2012/0011466 A1* | 1/2012 | Miyamoto | G06F 3/0485 | 715/786 |
| 2012/0062589 A1* | 3/2012 | Iwayama | G06F 16/338 | 345/619 |
| 2012/0198380 A1* | 8/2012 | Czertok | G06F 3/0482 | 715/780 |
| 2013/0050249 A1* | 2/2013 | Grabowski | G06T 15/20 | 345/619 |
| 2013/0060843 A1* | 3/2013 | Yamahara | G06Q 10/10 | 709/203 |
| 2013/0141463 A1* | 6/2013 | Barnett | G01C 21/3664 | 345/636 |
| 2014/0123005 A1* | 5/2014 | Forstall | G06F 3/04817 | 715/716 |
| 2014/0282042 A1* | 9/2014 | Millett | G06F 3/0482 | 715/739 |
| 2015/0302104 A1* | 10/2015 | Lin-Hendel | G06F 3/0482 | 707/770 |
| 2015/0347983 A1* | 12/2015 | Jon | G06Q 10/1095 | 705/7.19 |

OTHER PUBLICATIONS

Google Inc., "Swipe conversation list archive or delete? Gmail Help", [online], [retrieved on Apr. 23, 2013], Internet <URL:https://support.google.com/mail/answer/2951649?hl=en>.

* cited by examiner

FIG.4A

SEARCH RESULTS 100 RESULTS

COMMERCIAL ITEM 001
SHOP: XXX          XXXX YEN
COMMERCIAL ITEM 002
SHOP: XXX          XXXX YEN
COMMERCIAL ITEM 003
SHOP: XXX          XXXX YEN
COMMERCIAL ITEM 004
SHOP: XXX          XXXX YEN
COMMERCIAL ITEM 005
SHOP: XXX          XXXX YEN
COMMERCIAL ITEM 006
SHOP: XXX          XXXX YEN

FIG.4B

SEARCH RESULTS 100 RESULTS

COMMERCIAL ITEM 040
SHOP: XXX          XXXX YEN
COMMERCIAL ITEM 041
SHOP: XXX          XXXX YEN
COMMERCIAL ITEM 042
SHOP: XXX          XXXX YEN
COMMERCIAL ITEM 043
SHOP: XXX
COMMERCIAL ITEM 044
SHOP: XXX          XXXX YEN
COMMERCIAL ITEM 045
SHOP: XXX          XXXX YEN

FIG.4C

SEARCH RESULTS 100 RESULTS

COMMERCIAL ITEM 040
SHOP: XXX          XXXX YEN
COMMERCIAL ITEM 041
SHOP: XXX          XXXX YEN
COMMERCIAL ITEM 042
SHOP: XXX          XXXX YEN
COMMERCIAL ITEM 043
SHOP: XXX
COMMERCIAL ITEM 044
SHOP: XXX          XXXX YEN
COMMERCIAL ITEM 045
SHOP: XXX          XXXX YEN

FIG.4D

SEARCH RESULTS 100 RESULTS

COMMERCIAL ITEM 036
SHOP: XXX          XXXX YEN
COMMERCIAL ITEM 037
SHOP: XXX          XXXX YEN
COMMERCIAL ITEM 038
SHOP: XXX          XXXX YEN
COMMERCIAL ITEM 039
SHOP: XXX          XXXX YEN
COMMERCIAL ITEM 040
SHOP: XXX          XXXX YEN
COMMERCIAL ITEM 041
SHOP: XXX          XXXX YEN

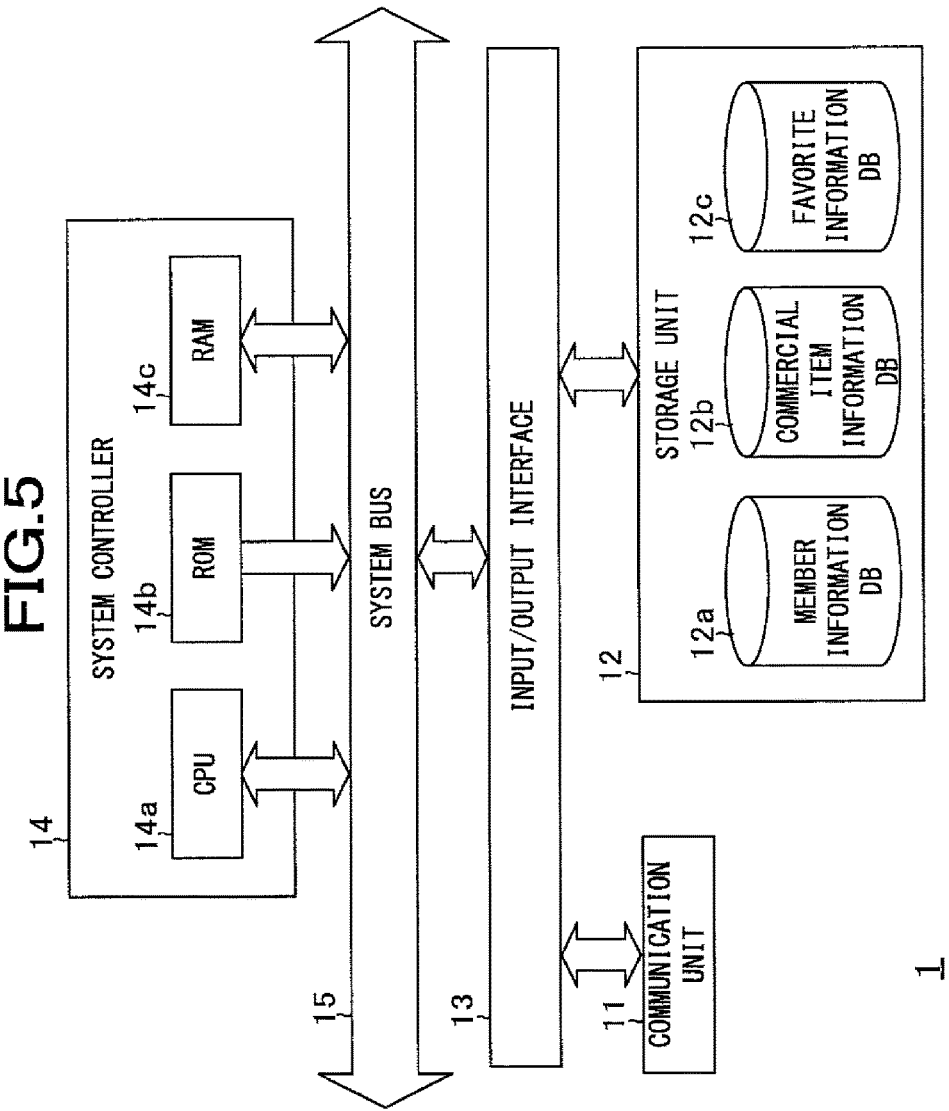

FIG.6A
MEMBER INFORMATION DB 12a

| USER ID |
| --- |
| PASSWORD |
| NICKNAME |
| NAME |
| BIRTH DATE |
| GENDER |
| ZIP CODE |
| ADDRESS |
| TELEPHONE NUMBER |
| E-MAIL ADDRESS |
| ... |

FIG.6D
OPERATION HISTORY DB 22a

| OPERATION DATE AND TIME |
| --- |
| OPERATION TYPE = "SCROLLING OPERATION" |
| SCROLL TARGET |
| SCROLLING DIRECTION |
| SCROLLING SPEED |
| SCROLLING DISTANCE |
| ... |

FIG.6B
STORE COMMERCIAL ITEM INFORMATION DB 12b

| STORE ID |
| --- |
| ITEM ID |
| PRODUCT CODE |
| GENRE ID |
| ITEM NAME |
| ITEM IMAGE URL |
| ITEM DESCRIPTION |
| ITEM PRICE |
| ... |

FIG.6C
FAVORITE INFORMATION DB 12c

| USER ID |
| --- |
| STORE ID |
| ITEM ID |
| ... |

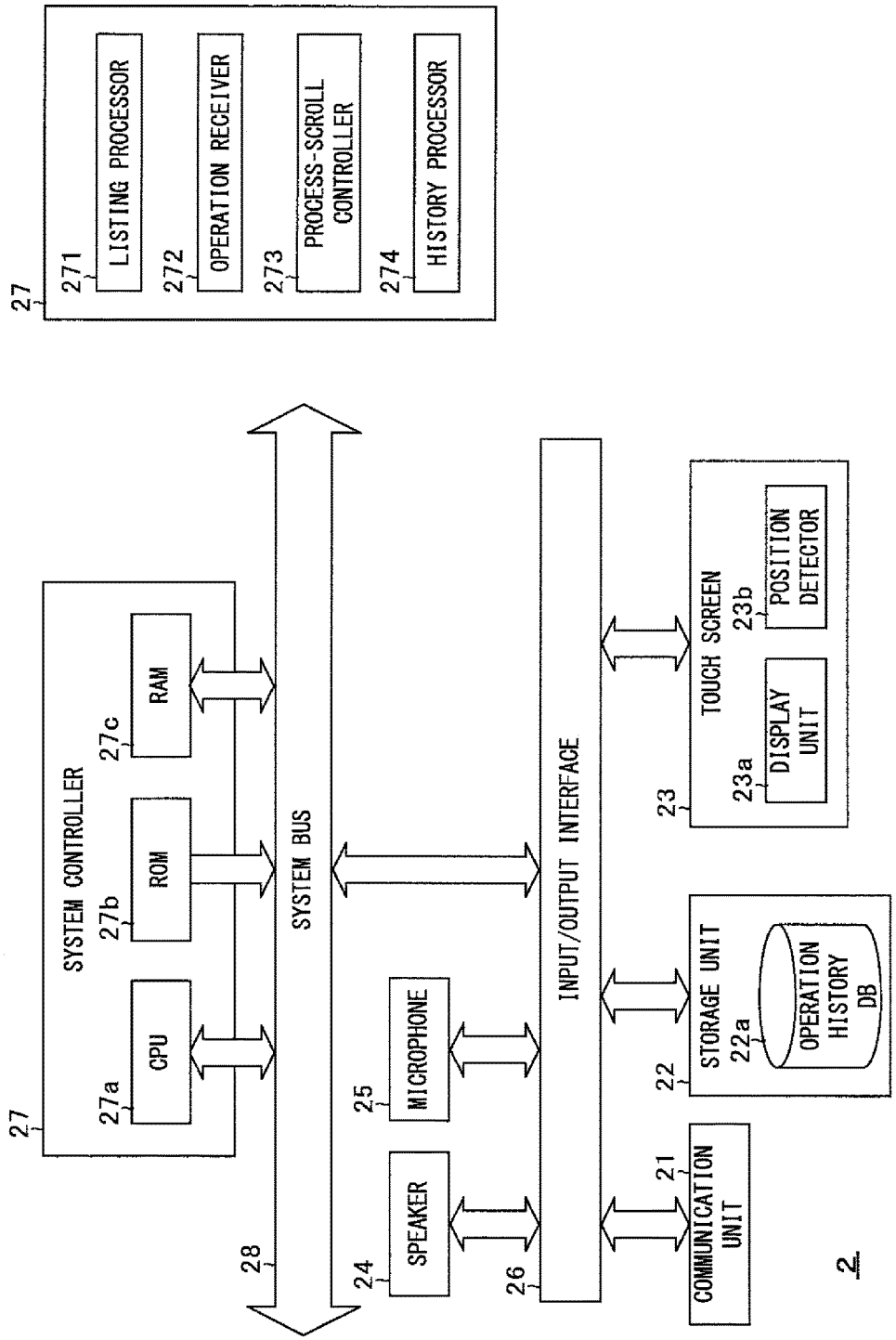

AUTOMATIC LIST SCROLLING APPARATUS, METHOD AND PROGRAM BASED ON A SELECTED ITEM

CROSS REFERENCE TO RELATED APPLICATIONS

This application is a National Stage of International Application No. PCT/JP2013/064867, filed on Jul. 29, 2013, the contents of all of which are incorporated herein by reference in their entirety.

TECHNICAL FIELD

The present invention relates to techniques for performing, in response to selection of an item from a list displayed in a scrollable format on a screen, a process for the selected element.

BACKGROUND ART

User interfaces that allow users to select one or more items from a displayed list are conventionally known. For example, Non-Patent Literature 1 discloses a technique that allows a user to select any e-mail by swiping on an e-mail list screen and archives the selected e-mail.

CITATION LIST

Non-Patent Literature

Non-Patent Literature 1: Google Inc., "Swipe conversation list archive or delete? Gmail Help", [online], [retrieved on Apr. 23, 2013], Internet <URL: https://support.google.com/mail/answer/2951649?hl=en>

SUMMARY OF INVENTION

Technical Problem

In some cases, however, after a user selects an item from a list, the user may wish to check whether there are any other items to be selected. To do this, for example, the user has to scroll through the list.

In view of the above point, it is an object of the present invention to provide an information processing apparatus, an information processing method, and an information processing program that can reduce the burden on a user who performs an operation to display items not being displayed in a display area.

Solution to Problem

To solve the above problem, an exemplary embodiment of the present disclosure provides an information processing apparatus that includes display control means, first receiving means, second receiving means, and process control means. The display control means causes some of a plurality of items to be listed in a display area on display means. The first receiving means receives an operation to cause at least one of items not being displayed in the display area, among the plurality of items, to be displayed in the display area. The second receiving means receives an operation to select one item from among the items displayed in the display area. The process control means causes a predetermined process corresponding to the operation received by the second receiving means to be performed for a first item selected by the operation and causes items to be arranged in the display area so that the first item or a second item arranged just before the first item among the plurality of items is the item arranged foremost among the items listed in the display area.

According to this invention, the selected first item or the second item arranged just before the first item is displayed foremost in the display area. Compared with items arranged after the first item, items arranged before the first item have probably been checked by a user. That is, after this, the user who has selected the first item is likely to check items arranged after the first item. Accordingly, the burden on the user who performs an operation to display items not being displayed in the display area in order to check items that the user is likely to check can be reduced.

Another exemplary embodiment of the present disclosure provides that the first receiving means may receive a scrolling operation, and the process control means may cause scrolling to be performed so that the first item or the second item is the item arranged foremost.

According to the present invention, scrolling is performed, so that the user can easily recognize, by viewing how the scrolling is being performed, which item to first check after the scrolling.

Yet another exemplary embodiment of the present disclosure provides that the process control means may cause items to be arranged in the display area so that the first item is the item arranged foremost.

According to this invention, the burden on the user who performs an operation to display items not being displayed in the display area in order to check items that the user is likely to check can be reduced.

Yet another exemplary embodiment of the present disclosure provides related item identifying means and determining means. The related item identifying means identifies a third item related to the first item, from among the items that are arranged before the first item among the plurality of items and are positioned outside the display area. The determining means determines whether the first item and the identified third item have a positional relationship that enables the first item and the third item to be displayed together in the display area. If the determining means determines that the positional relationship enables the first item and the third item to be displayed together, the process control means may cause items to be arranged in the display area so that the third item is the item arranged foremost.

According to this invention, when the third item related to the first item is arranged before the first item and is not being displayed in the display area, the third item is displayed in the display area after the process control means arranges the items. An item related to the item selected by the user is likely to be selected by the user. Accordingly, when the user checks items arranged after the first item, the burden on the user who displays items not being displayed in the display area can be prevented from increasing, and the burden on the user who performs an operation to display items not being displayed in the display area in order to check the third item that the user is likely to check can be reduced.

Yet another exemplary embodiment of the present disclosure provides storage control means and retrieval means. The storage control means stores, in storage means, logs of scrolling by scrolling operations received by the first receiving means. The retrieval means retrieves, from the storage means, logs of first scrolling and second scrolling. The first scrolling is performed over more than a predetermined amount. The second scrolling is performed following the first scrolling in the direction opposite to the direction of the first scrolling at a speed less than the speed of the first scrolling. The process control means may cause scrolling to be performed at the scrolling speed of any of the first scrolling and the second scrolling identified from the logs retrieved by the retrieval means.

According to this invention, scrolling can be performed at a speed appropriate for the user. Consequently, the user can recognize that the scrolling has been performed.

Yet another exemplary embodiment of the present disclosure provides that, when a first operation to cause the first item to be cleared from a list is received by the second receiving means, the process control means may cause items to be arranged in the display area so that the second item is the item arranged foremost. When a second operation different from the first operation is received by the second receiving means, the process control means may cause items to be arranged in the display area so that the first item is the item arranged foremost.

According to this invention, when the first item is cleared from the list, the second item arranged just before the first item is displayed foremost. Consequently, even if the first item is cleared, the user can recognize how much the items being displayed in the display area have moved.

Yet another exemplary embodiment of the present disclosure provides that, when the second item is displayed so as to be the item arranged foremost by the first operation and then an operation to undo the first operation is received, the process control means may move the second item out of the display area and redisplay the first item so as not to change the display positions of the other items positioned within the display area.

The second item that has probably been checked by the user moves out of the display area, so that the second item is not displayed. On the other hand, the display positions of the items, other than the second item, which have been displayed in the display area just before the first item is redisplayed remain unchanged also after the first item is redisplayed. Accordingly, the burden on the user who performs an operation to display items not being displayed in the display area in order to check items that the user is likely to check can be reduced.

Yet another exemplary embodiment of the present disclosure provides an information processing method performed by a computer. The method includes the following steps. Some of a plurality of items are caused to be listed in a display area on display means. An operation to cause at least one of items not being displayed in the display area, among the plurality of items, to be displayed in the display area is received. An operation to select one item from among the items displayed in the display area is received. For a first item selected by the received operation to select one item, a predetermined process corresponding to the operation is performed. Items are caused to be arranged in the display area so that the first item or a second item arranged just before the first item among the plurality of items is the item arranged foremost among the items listed in the display area.

Yet another exemplary embodiment of the present disclosure provides an information processing program that causes a computer to function as display control means, first receiving means, second receiving means, and process control means. The display control means lists some of a plurality of items in a display area on display means. The first receiving means receives an operation to cause at least one of items not being displayed in the display area, among the plurality of items, to be displayed in the display area. The second receiving means receives an operation to select one item from among the items displayed in the display area. The process control means performs, for a first item selected by the operation received by the second receiving means, a predetermined process corresponding to the operation and causing items to be arranged in the display area so that the first item or a second item arranged just before the first item among the plurality of items is the item arranged foremost among the items listed in the display area.

Advantageous Effects of Invention

According to the present invention, the selected first item or the second item arranged just before the first item is displayed foremost in the display area. Accordingly, the burden on the user who performs an operation to display items not being displayed in the display area in order to check items that the user is likely to check can be reduced.

BRIEF DESCRIPTION OF DRAWINGS

FIGS. 4A to 4D are diagrams showing an example of a series of scroll operations used to determine a scrolling speed.

FIG. 5 is a block diagram schematically showing an example configuration of an online marketplace server 1 according to an embodiment.

FIG. 6A is a diagram showing example contents stored in a member information DB 12a.

FIG. 6B is a diagram showing example contents stored in a commercial item information DB 12b.

FIG. 6C is a diagram showing example contents stored in a favorite information DB 12c.

FIG. 6D is a diagram showing example contents stored in an operation history DB 22a.

FIG. 7A is a block diagram schematically showing an example configuration of a user terminal 2 according to an embodiment.

FIG. 7B is a diagram showing example functional blocks of the online marketplace server 2 according to an embodiment.

DESCRIPTION OF EMBODIMENTS

The following describes an embodiment of the present invention in detail with reference to the drawings. The embodiment described below is an embodiment in which the present invention is applied to an information processing system.

1. Configuration and Functional Overview of Information Processing System

Figure 1:
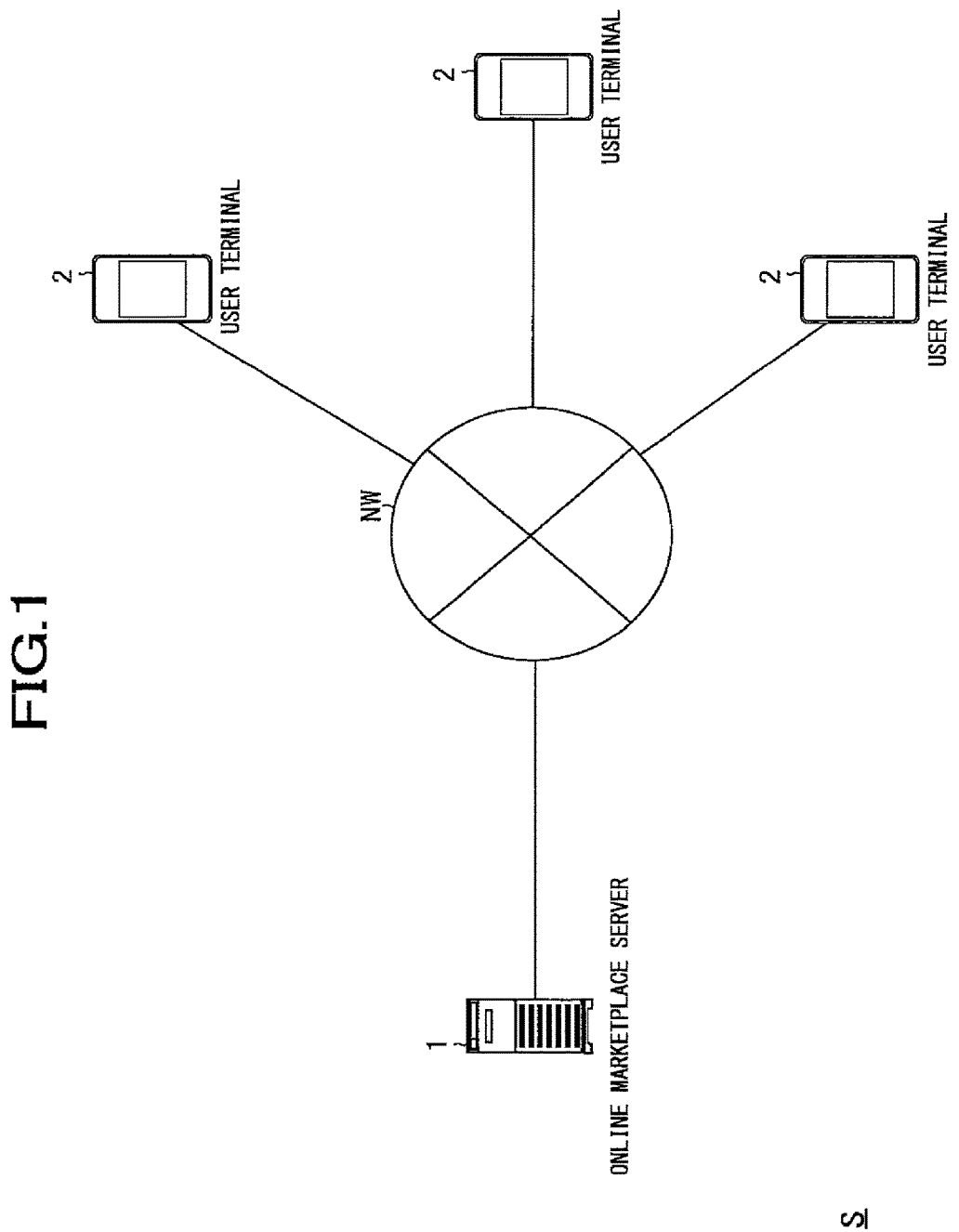
FIG. 1 is a diagram schematically showing an example configuration of an information processing system S according to an embodiment.

First, a configuration and a functional overview of an information processing system S according to this embodiment are described with reference to FIGS. 1 to 4D. FIG. 1 is a diagram schematically showing an example configuration of the information processing system S according to this embodiment.

As shown in FIG. 1, the information processing system S includes an online marketplace server 1 and a plurality of user terminals 2. The online marketplace server 1 can exchange data with each user terminal 2 via a network NW using communication protocols, such as TCP/IP. The network NW includes, for example, the Internet, a dedicated communication line (e.g., community antenna television (CATV) line), a mobile communication network (including base stations), and a gateway.

The online marketplace server 1 is a server device that performs various processes related to an online marketplace through which commercial items can be purchased. Users can purchase any desired commercial item from any desired store in the online marketplace. The online marketplace server 1 performs, for example, processes related to commercial item searches and purchases in response to requests from the user terminals 2.

The user terminal 2 is a terminal device of a user who uses the online marketplace. The user terminal 2 is an example of an information processing apparatus according to the present invention. In this embodiment, the user terminal 2 is a smartphone with a touch screen. The user terminal 2 may be, for example, a personal computer, a personal digital assistant (PDA), a mobile phone, or a set-top box.

The user terminal 2 has an online marketplace application installed on it. The online marketplace application is dedicated application software used to shop in the online marketplace through a smartphone. The user terminal 2 sends a request corresponding to a user operation to the online marketplace server by executing the online marketplace application. The online marketplace server 1 sends, to the user terminal 2, information corresponding to the result of a process based on the request. The user terminal 2 displays a screen based on the received information.

Figure 2A:
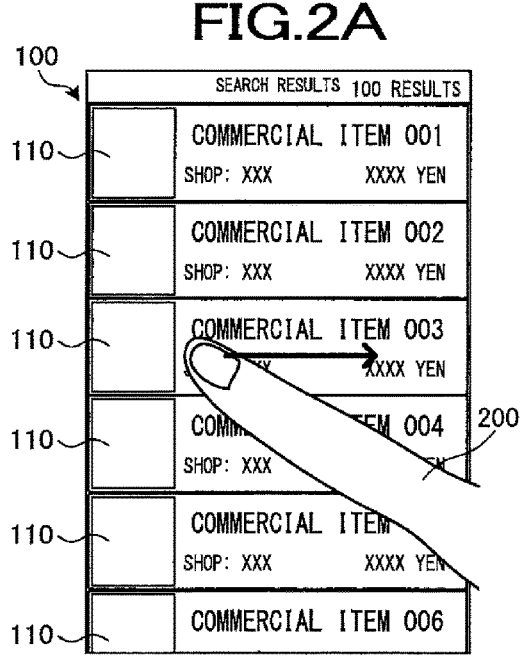
FIGS. 2A and 2B are diagrams showing an example display of a list during an add-to-favorites operation.

Example of information displayed on the screen of the user terminal 2 include a list of simple information about commercial items. Each piece of simple information is brief information about a commercial item. Each piece of simple information is an example of an item of the present invention. FIG. 2A is a diagram showing an example display of a simple information list. As shown in FIG. 2A, the screen of the user terminal 2 includes a display area 100. The display area 100 is an area for displaying the simple information. The screen may be partially or entirely occupied by the display area 100. In the display area 100, a plurality of pieces of simple information 110 are displayed. In the example of FIG. 2A, six pieces of simple information of commercial items 001 to 006, among 100 commercial items, are being displayed. The pieces of simple information of commercial items 007 to 100 are yet to be displayed. Pieces of simple information are displayed, for example, vertically downward from the top of the screen. That is, simple information arranged more forward among the pieces of simple information is displayed higher. Alternatively, simple information arranged more forward may be displayed lower. The pieces of simple information may be displayed horizontally side by side. Examples of the simple information list include a search results list and a favorites list. The search results list is a list of commercial items retrieved in response to a search request operation by a user. The favorites list is a list of commercial items added as the user's favorites.

A user can perform various operations on a list being displayed. For example, the user can perform an operation to scroll through the list and an operation to select a piece of simple information. In this embodiment, "scroll" means to slide simple information not displayed to be displayed. However, "scroll" may mean to slide the display area itself to display simple information. A scrolling operation is an example of an operation to cause at least one piece of simple information not being displayed in the display area, among a plurality of pieces of simple information, to be displayed in the display area.

An operation to select simple information is also an operation to select a commercial item corresponding to the simple information. Examples of the operation to select simple information include an operation to display a details screen, an add-to-favorites operation, and a delete-from-favorites operation. The details screen is a screen to display detailed information about a commercial item. For example, if the user taps any simple information on the list, the details screen for the selected commercial item is displayed. The add-to-favorites operation is an operation to add a commercial item to the favorites. For example, if the user flicks any simple information on the search results list to the right, the selected commercial item is added to the favorites. A favorite operation is an example of a second operation of the present invention. The delete-from-favorites operation is an operation to delete a commercial item from the favorites. For example, if the user flicks any simple information on the favorites list to the left, the selected commercial item is deleted from the favorites. The delete-from-favorites operation is an example of a first operation of the present invention. The operation to select simple information is not limited to the above operations. For example, the operation to select simple information may be an operation to select a plurality of commercial items to compare them. The operation to select simple information is not limited to tapping and flicking.

Also after the add-to-favorites operation or the delete-from-favorites operation, the list remains displayed on the screen. At this time, the user may wish to check whether there are any other commercial items to be selected. However, when there are many commercial items, the pieces of simple information of the commercial items cannot be displayed in a list all at once. In such a case, the user may have to perform an operation to scroll through the list. For this reason, the user terminal 2 performs automatic scrolling to reduce the burden on the user who scrolls through the list. Specifically, the user terminal 2 performs scrolling so that the selected simple information or the simple information arranged just before the selected simple information is displayed foremost among the pieces of simple information listed in the display area. The scrolling direction in this case is the direction from the selected simple information to simple information arranged before the selected simple information. In this embodiment, the scrolling direction is upward. The automatic scrolling by the user terminal 2 is an example of a process for arranging pieces of simple information in the display area so that the selected simple information or the simple information arranged just before the selected simple information is displayed foremost.

Figure 2B:
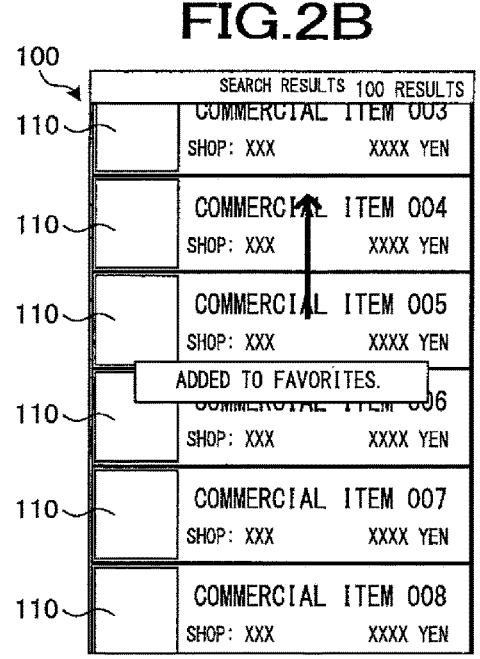

FIGS. 2A and 2B are diagrams showing an example display of a list during an add-to-favorites operation. For example, as shown in FIG. 2A, a user flicks the simple information 110 of the commercial item 003 to the right with his or her finger 200. Then, as shown in FIG. 2B, the user terminal 2 scrolls through the list so that the simple information 110 of the commercial item 003 is positioned at the top of the display area 100. At this time, the simple information 110 of the commercial item 003 may be fully or only partially displayed. In FIG. 2B, the pieces of simple information 110 of the commercial items 003 to 008 are being displayed. The pieces of simple information 110 of the commercial items 001 and 002 are arranged before the simple information 110 of the commercial item 003. However, the simple information 110 of the commercial item 003 is arranged foremost among the pieces of simple information 110 being currently displayed.

When viewing a list, a typical user sequentially checks pieces of simple information from the simple information arranged first. Thus, when the user selects certain simple information, there is a high probability that simple information arranged before the selected simple information has been already checked by the user. The simple information already checked does not need to remain displayed. For this reason, the user terminal 2 causes the simple information that has probably been checked to scroll out of the display area. The user terminal 2 thus performs a certain amount of scrolling in advance. The scrolling reduces the amount of scrolling required for the user to check the pieces of simple information of other commercial items. Accordingly, the user's burden is reduced. The amount of scrolling is the distance on the screen that simple information moves by the scrolling. In the example of FIGS. 2A and 2B, the pieces of simple information of the commercial items 001 and 002 have probably been checked. At the time shown in FIG. 2A, the user has to scroll through the list to check the simple information 110 of the commercial item 007 or 008. On the other hand, at the time shown in FIG. 2B, the user does not have to scroll through the list. The amount of scrolling required for the user to check the pieces of simple information 110 of commercial items 009 to 100 at the time shown in FIG. 2B is less than that at the time shown in FIG. 2A.

When the user selects a plurality of commercial items, the user may wish to select a related commercial item. The related commercial item is a commercial item related to the commercial item already selected. Examples of the related commercial item include the same commercial item sold by a different store, a commercial item belonging to the same genre, and a commercial item to be used together. In some cases, the simple information of the related commercial item is arranged before the simple information of the commercial item already selected. If the simple information of the related commercial item has already scrolled out of the display area, the user have to scroll down the list to check the simple information of the related commercial item. In this case, if the list is automatically scrolled up as shown in FIG. 2B, the user's burden increases. Thus, the user terminal 2 may determine whether the selected simple information and the simple information of the related commercial item have a positional relationship that enables themselves to be displayed together in the display area. Here, at least part of the selected simple information may be displayed in the display area, and the at least part of the simple information of the related commercial item may be displayed in the display area. When the user terminal 2 determines that they have a positional relationship that enables themselves to be displayed together, the user terminal 2 may perform scrolling so that the simple information of the related commercial item is displayed foremost among the pieces of simple information listed in the display area. Consequently, the simple information of the selected commercial item is displayed at the top of the display area, and the selected simple information is also displayed in the display area. Thus, the user can check the simple information of the related commercial item without scrolling through the list. The user can also recognize, for example, where the selected simple information has been moved by the automatic scrolling and how much the list has been scrolled through.

Figure 2C:
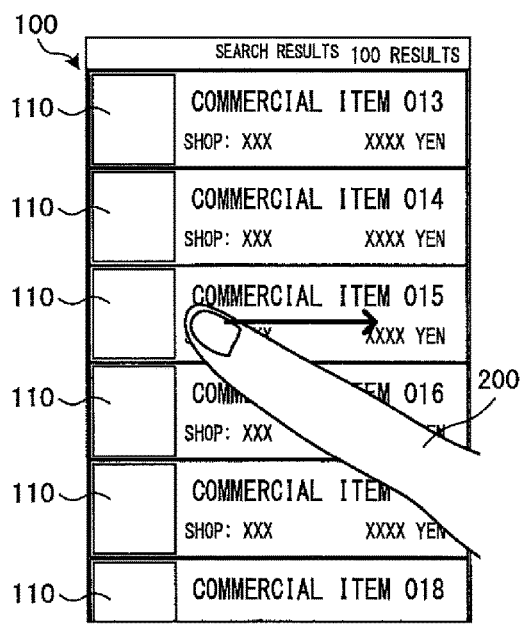
FIGS. 2C and 2D are diagrams showing another example display a list during an add-to-favorites operation.
Figure 2D:
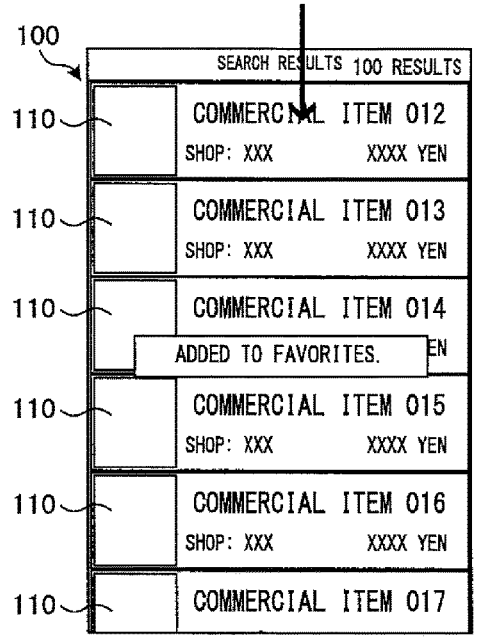

FIGS. 2C and 2D are diagrams showing another example display of a list during an add-to-favorites operation. As shown in FIG. 2C, the pieces of simple information 110 of the commercial items 013 to 018 are being displayed in the display area 100. Here, the user flicks the simple information 110 of the commercial item 015 to the right. Assume that a related commercial item of the commercial items 015 is the commercial item 0012. Six pieces of simple information 110 can be displayed together in the display area 100. Thus, the simple information 110 of the commercial item 015 and the simple information 110 of the commercial item 0012 can be displayed together. Thus, as shown in FIG. 2D, the user terminal 2 scrolls down the list so that the simple information 110 of the commercial item 012 is positioned at the top of the display area 100. On the other hand, assume that a related commercial item of the commercial items 015 is a commercial item 0008. In this case, the simple information 110 of the commercial item 015 and the simple information 110 of the commercial item 0008 cannot be displayed together. Thus, the user terminal 2 scrolls up the list so that the simple information 110 of the commercial item 015 is positioned at the top of the display area 100.

In a favorites list, the simple information of a commercial item deleted from the favorites by a delete-from-favorites operation is cleared from the favorites list. In this case, the user may not be able to recognize where the selected simple information has been move by the automatic scrolling. Thus, the user terminal 2 may scroll through the favorites list so that the simple information arranged just before the selected simple information is displayed foremost among the pieces of simple information listed in the display area. The simple information arranged just before the selected simple information has probably been checked by the user. Thus, the user can recognize, from the simple information arranged just before, where the position at which the selected simple information was displayed has been moved.

Figure 3A:
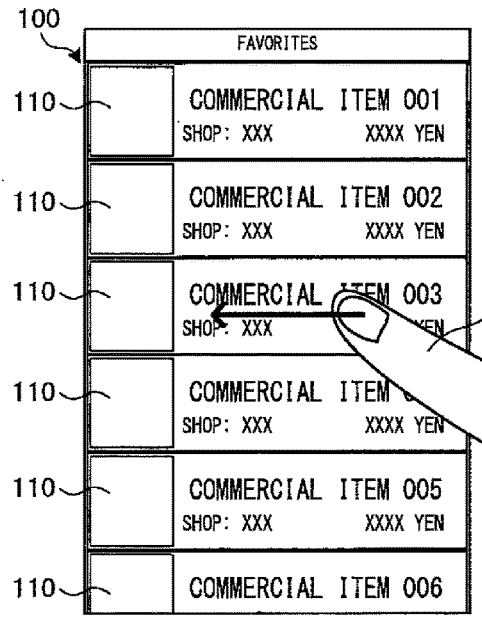
FIGS. 3A and 3B are diagrams showing an example display of a list during a delete-from-favorites operation.
Figure 3B:
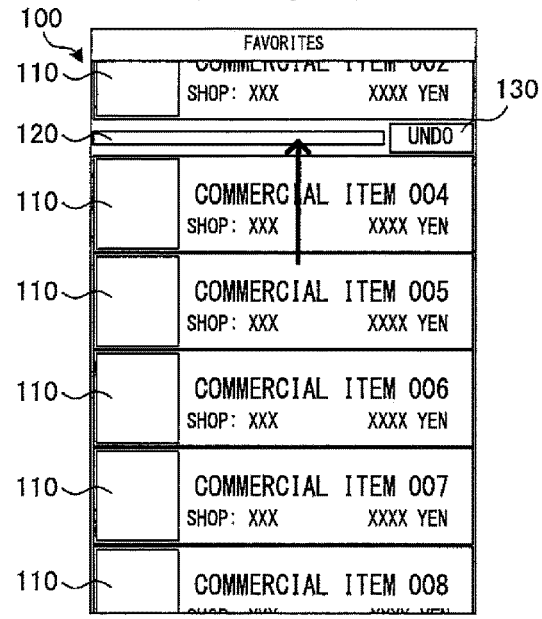

FIGS. 3A and 3B are diagrams showing an example display of a list during a delete-from-favorites operation. As shown in FIG. 3A, the pieces of simple information 110 of the commercial items 001 to 006 are being displayed in the display area 100. Here, the user flicks the simple information 110 of the commercial item 003 to the left. Then, as shown in FIG. 3B, the user terminal 2 clears the simple information 110 of the commercial item 003 from the list and scrolls up the list so that the simple information 110 of the commercial item 002 is positioned at the top of the display area 100. Consequently, the pieces of simple information 110 of the commercial items 002 to 008 are displayed in the display area 100. At this time, the user terminal 2 may display, for example, a bar 120 at the position where the simple information 110 of the commercial item 003 was displayed. That is, the user terminal 2 may change the simple information 110 of the commercial item 003 into the bar 120. The display of the bar 120 enables the user to recognize where the simple information 110 of the commercial item 003 was displayed. The bar 120 has a shorter vertical length than the simple information 110. In addition, the user terminal 2 may display, for example, an undo button 130 next to the bar 120. The undo button 130 is a button for undoing (canceling) a delete-from-favorites operation.

When an operation to undo a delete-from-favorites operation is performed, the user terminal 2 redisplays the simple information that has just been cleared from the list. At this time, the user terminal 2 needs to move, among the pieces of simple information being displayed in the display area, the simple information arranged just before the simple information to be redisplayed or the pieces of simple information arranged after the simple information to be redisplayed. The user terminal 2 may move the simple information arranged just before the simple information to be redisplayed out of the display area so as not to change the display positions of the pieces of simple information arranged after the simple information to be redisplayed. The simple information arranged just before the simple information to be redisplayed has probably been checked by the user. Thus, there is no need to keep the simple information arranged just before the simple information to be redisplayed displayed. On the other hand, it is unlikely that the pieces of simple information arranged after the simple information to be redisplayed have already been checked by the user. Thus, it is preferable that these pieces of simple information remains displayed.

Figure 3C:
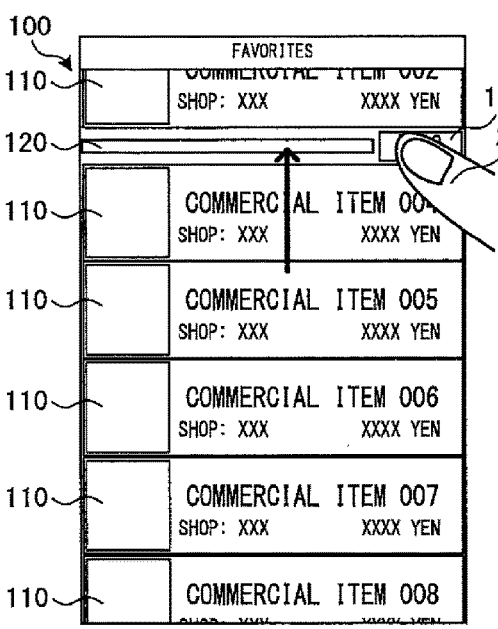
FIGS. 3C and 3D are diagrams showing an example display of a list during an operation to undo a delete-from-favorites operation.
Figure 3D:
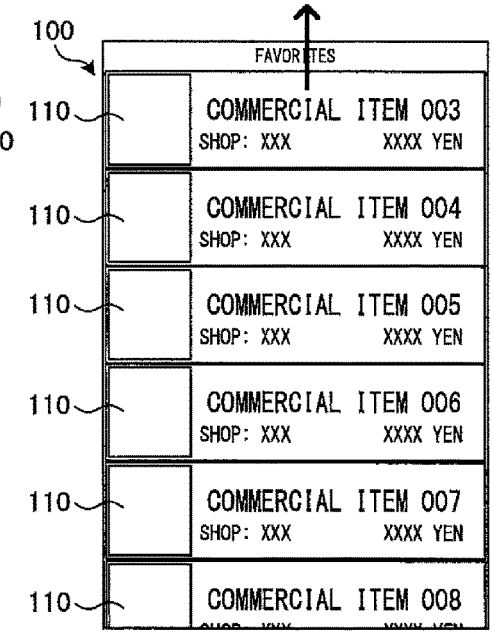

FIGS. 3C and 3D are diagrams showing an example display of a list during an operation to undo a delete-from-favorites operation. Assume that the user taps the undo button 130 after the scrolling shown in FIG. 3B, as shown in FIG. 3C. Then, as shown in FIG. 3D, the user terminal 2 moves the simple information 110 of the commercial item 002 upward out of the display area 100 and redisplays the simple information 110 of the commercial item 003. The display positions of the commercial items 004 to 008 remain unchanged. Assume that the user terminal 2 moves the pieces of simple information 110 of the commercial items 004 to 008 downward. Accordingly, the simple information 110 of the commercial item 008 moves out of the display area 100. In this case, the user has to scroll through the list to check the simple information 110 of the commercial item 008. The amount of scrolling required for the user to check the pieces of simple information 110 of the commercial items 009 to 100 is more than that in the case of FIG. 3D.

When an operation to select simple information is performed, the user terminal 2 performs the automatic scrolling. If the scrolling speed at this time is too high, the user cannot recognize that the scrolling has been performed. On the other hand, if the scrolling speed is too low, it takes time for the user to perform a subsequent operation. For these reasons, the user terminal 2 may determine the speed of the automatic scrolling so that the scrolling speed is appropriate for the user. The speed of the automatic scrolling is referred to as the automatic scrolling speed. For example, the user terminal 2 may determine the automatic scrolling speed based on the user's scrolling operation history.

FIGS. 4A to 4D are diagrams showing an example of a series of scrolling operations used to determine a scrolling speed. For example, assume that the user has to considerably scroll through a list to search for simple information. In this case, for example, as shown in FIG. 4A, the user quickly flicks upward on the display area 100. Then, the list is scrolled up at high speed. The user may scroll the list down. While viewing the list being scrolled through at high speed, the user determines, for example, how much the list has been scrolled through or whether the simple information the user is searching for has appeared. Subsequently, for example, as shown in FIG. 4B, the user taps the display area 100 to stop the scrolling of the list. Alternatively, for example, the scrolling speed may gradually decrease, and the scrolling may finally stop. Alternatively, for example, the scrolling may stop after the list is scrolled up to the last simple information. At this time, the simple information the user is searching for has probably scrolled out of the display area 100. Thus, for example, as shown in FIG. 4C, the user lightly flicks in the direction opposite to that shown in FIG. 4A. Alternatively, the user may slowly slide the finger 200. Then, as shown in FIG. 4D, the list is scrolled down at low speed. While viewing the list being scrolled through at low speed, the user searches for his or her desired simple information.

When the scrolling shown in FIG. 4D follows the scrolling shown in FIG. 4A, the scrolling shown in FIG. 4A is referred to as high-speed first scrolling, and the scrolling shown in FIG. 4D is referred to as low-speed second scrolling. The high-speed first scrolling is an example of first scrolling of the present invention. The low-speed second scrolling is an example of second scrolling of the present invention. The speed of the low-speed second scrolling is a speed at which the user can recognize the content of simple information. That is, the user can recognize that the scrolling is being performed. Thus, the user terminal 2 may determine the scrolling speed of the low-speed second scrolling as the automatic scrolling speed. On the other hand, the scrolling speed of the high-speed first scrolling is a speed at which the user can probably not recognize the content of simple information. However, the user can probably recognize how much the list is being scrolled through. That is, the user can recognize that the scrolling is being performed. Thus, the user terminal 2 may determine the scrolling speed of the high-speed first scrolling as the automatic scrolling speed.

How to identify the high-speed first scrolling and the low-speed second scrolling is now described. When scrolling has been performed over more than a preset reference distance, the user terminal 2 determines the scrolling as a candidate for the high-speed first scrolling, and determines scrolling that has followed the candidate for the high-speed first scrolling as a candidate for the low-speed second scrolling. When the scrolling speed of the candidate for the low-speed second scrolling is less than the scrolling speed of the candidate for the high-speed first scrolling and the scrolling direction of the candidate for low-speed second scrolling is opposite to the scrolling direction of the candidate for the high-speed first scrolling, the user terminal 2 determines these candidate as the high-speed first scrolling and the low-speed second scrolling.

The automatic scrolling speed may be preset. Also for example, the user terminal 2 may determine the scrolling speed of normal scrolling performed by the user's scrolling operation as the automatic scrolling speed.

2. Configuration of Each Device 2-1. Configuration of Online Marketplace Server

The following describes a configuration of the online marketplace server 1 with reference to FIGS. 5 and 6A to 6D.

FIG. 5 is a block diagram schematically showing an example configuration of the online marketplace server 1 according to this embodiment. As shown in FIG. 5, the online marketplace server 1 includes a communication unit 11, a storage unit 12, an input/output interface 13, and a system controller 14. The system controller 14 and the input/output interface 13 are connected via a system bus 15.

The communication unit 11 connects to the network NW and controls the state of communications with, for example, the user terminal 2.

The storage unit 12 includes, for example, hard disk drives. In this storage unit 12, a member information DB 12a, a commercial item information DB 12b, a favorite information DB 12c, and other databases have been created. "DB" is an abbreviation for "database".

FIG. 6A is a diagram showing example contents stored in the member information DB 12a. The member information DB 12a stores member information about users who have signed up for the online marketplace. Specifically, the member information DB 12a stores, in association with each user, the user's user ID, password, nickname, name, birth date, gender, zip code, address, telephone number, e-mail address, and other user attributes.

FIG. 6B is a diagram showing example contents stored in the commercial item information DE 12b. The commercial item information DB 12b stores commercial item information about commercial items being sold in the online marketplace. Specifically, the commercial item information DB 12b stores, in association with each commercial item that each store sells, the store's store ID, the commercial item's item ID, product code, genre ID, name, the URL of an item image, the commercial item's description, price, and other information. The store ID is identification information of the store that sells the commercial item. The item ID is identification information of the commercial item and is used for the store to manage the commercial item for sale. The product code is a code number identifying the commercial item. The product code may be, for example, a JAN code. The genre ID indicates a genre to which the commercial item belongs.

FIG. 6C is a diagram showing example contents stored in the favorite information DB 12c. The favorite information DB 12c stores favorite information about users' favorites. Specifically, the favorite information DB 12c stores a user ID, a store ID, an item ID, and other information, in association with each favorited commercial item. The user ID indicates a user who added the commercial item to his or her favorites. The store ID indicates a store that sells the commercial item added to the favorites. The item ID indicates the commercial item added to the favorites.

The following describes other information stored in the storage unit 12. The storage unit 12 stores various data, such as hypertext markup language (HTML) documents, extensible markup language (XML) documents, image data, text data, and electronic documents, for displaying web pages. The storage unit 12 also stores various setting values.

The storage unit 12 also stores various programs, such as an operating system, a World Wide Web (WWW) server program, a database management system (DBMS), and an e-commerce management program. The e-commerce management program is a program for performing various processes related to e-commerce. The various programs may be available from, for example, another server device via the network NW, or may be recorded in a recording medium, such as a digital versatile disc (DVD), and be read via a drive device. The various programs may be program products.

The input/output interface 13 performs interface processing between the communication unit 11 and the storage unit 12, and the system controller 14.

The system controller 14 includes, for example, a CPU 14a, a read only memory (ROM) 14b, and a random access memory (RAM) 14c. The various programs, which are read and executed by the CPU 14a, enable the system controller 14 to control parts of the online marketplace server 1.

The online marketplace server 1 may include a plurality of server devices. For example, a server device that handles commercial item searches and orders in the online marketplace, a server device that sends web pages in response to requests from the user terminals 2, a server device that manages the databases, and other server devices may be connected to each other via a LAN or the like.

2-2. Configuration of User Terminal

The following describes a configuration of the user terminal 2 with reference to FIGS. 6A to 7B.

FIG. 7A is a block diagram schematically showing an example configuration of the user terminal 2 according to this embodiment.

As shown in FIG. 7A, the user terminal 2 includes a communication unit 21, a storage unit 22, a touch screen 23, a speaker 24, a microphone 25, an input/output interface 26, and a system controller 27. The system controller 27 and the input/output interface 26 are connected via a system bus 28.

The communication unit 21 connects to the network NW and controls the state of communications with, for example, the online marketplace server 1.

The storage unit 22 includes, for example, flash memories. The storage unit 22 is an example of storage means of the present invention. In this storage unit 22, an operation history DB 22a has been created.

FIG. 6D is a diagram showing example contents stored in the operation history DB 22a. The operation history DB 22a stores a user's operation logs in the online marketplace application. Specifically, every time an operation is performed, an operation date and time, and an operation type are stored in association with each other in the operation history DB 22a. The operation date and time is the date and time when the operation was performed. The operation type indicates the type of the operation. Examples of the operation type include "search operation", "scrolling operation", "scrolling stop operation", "add-to-favorites operation", "delete-from-favorites operation", and "undo operation". When the operation type is "scrolling operation", for example, a scroll target, a scrolling direction, a scrolling speed, and a scrolling distance are further stored in the operation history DB 22a. Examples of the scroll target include the search results list and the favorites list. An operation log in which the operation type is "scrolling operation" and the operation target is "simple information list" is an example of a log of the present invention. The scrolling direction is the direction in which a list was scrolled through. The scrolling speed is the speed at which the list was scrolled through. After scrolling of the list starts, the scrolling speed may gradually decrease with a predetermined acceleration. In this case, the initial speed of the scrolling may be stored as the scrolling speed in the operation history DB 22a.

The storage unit 22 stores various programs, such as an operating system and the online marketplace application. The online marketplace application is an example of an information processing program according to the present invention. The online marketplace application may be available from, for example, another server device via the network NW, or may be recorded in a recording medium, such as a digital versatile disc (DVD), and be read via a drive device. The online marketplace application may be a program product.

The touch screen 23 acts as a display and an input device. The touch screen 23 includes a display unit 23a and a position detector 23b. The display unit 23a includes, for example, a liquid crystal display and is configured to display characters, images, and other information. The display unit 23a is an example of display means of the present invention. The position detector 23b detects the coordinates of a point at which a user touches the touch screen 23, for example, with his or her finger or a touch pen (stylus pen). The position detector 23b then outputs the detected coordinates to the system controller 27.

The input/output interface unit 26 performs interface processing between the communication unit 21 to the microphone 25, and the system controller 27.

FIG. 7B is a diagram showing example functional blocks of the user terminal 2 according to this embodiment. The system controller 27 includes, for example, a CPU 27a, a ROM 27b, and a RAM 27c. As shown in FIG. 7B, the online marketplace application and other programs stored in the storage unit 22, which are read and executed by the CPU 27a, enable the system controller 27 to function as a listing processor 271, an operation receiver 272, a process-scroll controller 273, and a history processor 274. The listing processor 271 is an example of display control means of the present invention. The operation receiver 272 is an example of receiving means of the present invention. The process-scroll controller 273 is an example of process control means, and determining means of the present invention. The history processor 274 is an example of storage control means and retrieval means of the present invention.

The listing processor 271 causes the display unit 23a to display a simple information list. The operation receiver 272 receives user operations. Specifically, the operation receiver 272 identifies operation details based on the coordinates output from the position detector 23b. When a scrolling operation is received, the operation receiver 272 identifies the scrolling direction and the scrolling speed. When a simple information selection operation is received, the operation receiver 272 identifies the type of the selection operation and the selected simple information. The process-scroll controller 273 performs a predetermined process corresponding to a selection operation received by the operation receiver 272. The process-scroll controller 273 also automatically scrolls through the simple information list in response to a simple information selection operation. The predetermined process and the scrolling may be performed simultaneously, or either of them may be performed first. The history processor 274 stores, in the operation history DB 22a, logs of scrolling performed by the process-scroll controller 273. The history processor 274 also retrieves, from the operation history DB 22a, operation logs of the high-speed first scrolling and the low-speed second scrolling. Then, the history processor 274 determines the automatic scrolling speed based on the retrieved operation logs.

3. Operation of Information Processing System

The following describes an operation of the information processing system S with reference to FIGS. 8 to 11B.

Figure 8:
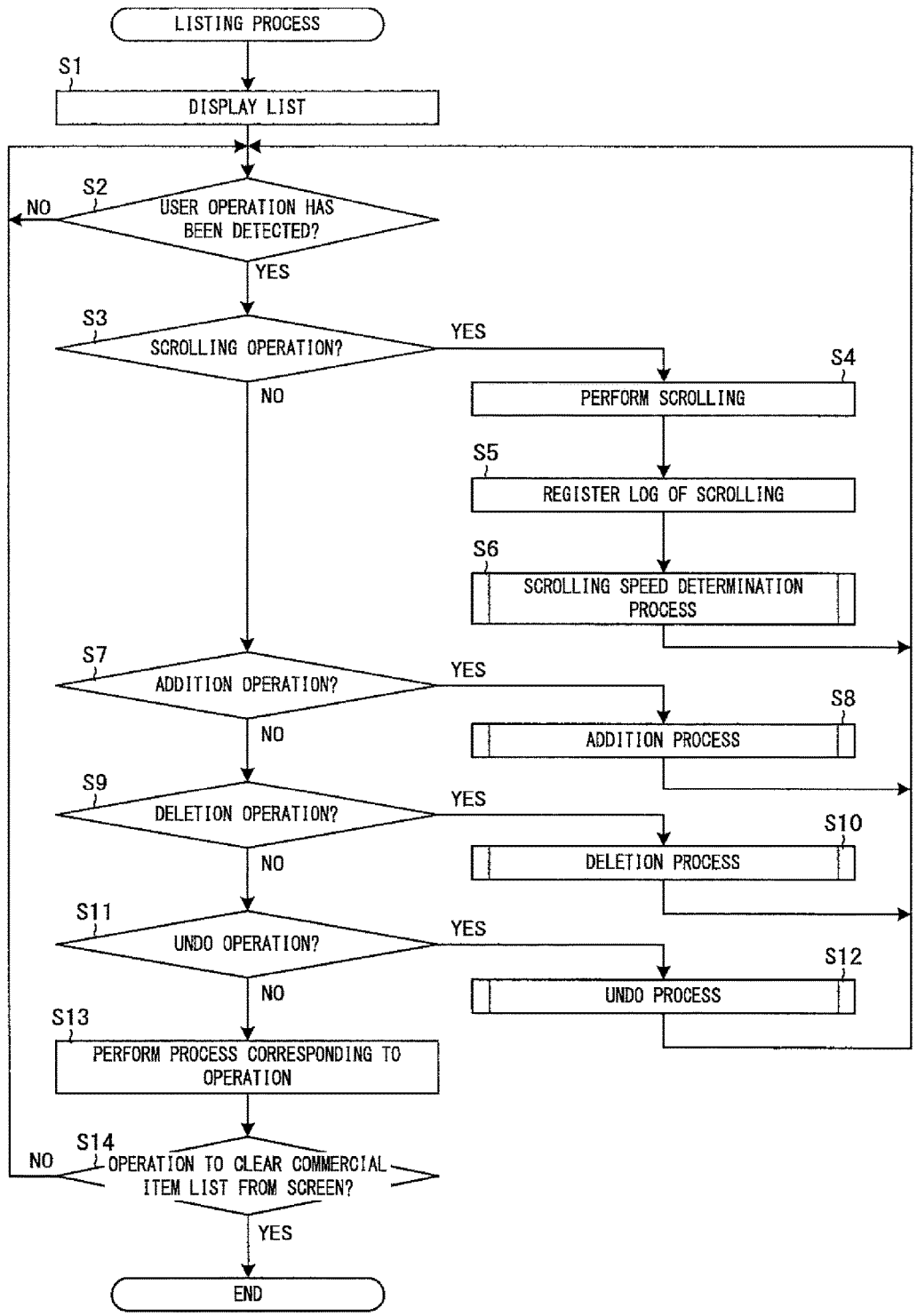
FIG. 8 is a flowchart showing an example process of a listing process in a system controller 27 of the user terminal 2 according to an embodiment.

FIG. 8 is a flowchart showing an example process of a listing process in the system controller 27 of the user terminal 2 according to this embodiment. The listing process is initiated, for example, when a user performs an operation to cause a simple information list to be displayed.

As shown in FIG. 8, in response to a user operation, the listing processor 271 causes a simple information list to be displayed in the display area on the screen. For example, when the user performs an operation to search for commercial items, the system controller 27 sends a search request to the online marketplace server 1. The online marketplace server 1 searches for a plurality of commercial items based on the search request and the commercial item information DB 12b. The online marketplace server 1 retrieves, from the commercial item information DB 12b, information for listing the pieces of simple information of found commercial items. The online marketplace server 1 sends the retrieved information to the user terminal 2. For example, when the user performs an operation to display his or her favorites, the system controller 27 sends a favorites request to the online marketplace server 1. The online marketplace server 1 identifies, based on the favorite information DB 12c, the commercial items added to the favorites by the user. Subsequently, the online marketplace server 1 retrieves, from the commercial item information DB 12b, information for listing the pieces of simple information of the commercial items added to the favorites. The online marketplace server 1 sends the retrieved information to the user terminal 2. The listing processor 271 displays the simple information list based on the information received from the online marketplace server 1.

Then, the operation receiver 272 determines whether any user operation has been detected, based on signals output from the position detector 23b (Step S2). Here, if the operation receiver 272 determines that no user operation has been detected (NO in Step S2), the process proceeds to Step S2. On the other hand, if the operation receiver 272 determines that a user operation has been detected (YES in Step S2), the process proceeds to Step S3.

In Step S3, the operation receiver 272 determines whether the detected user operation is a scrolling operation. Here, if the operation receiver 272 determines that the detected user operation is the scrolling operation (YES in Step S3), the process proceeds to Step S4. On the other hand, if the operation receiver 272 determines that the detected user operation is not the scrolling operation (NO in Step S3), the process proceeds to Step S7. In Step S4, the process-scroll controller 273 scrolls through the list in the identified scrolling direction at the identified scrolling speed. Subsequently, the history processor 274 registers an operation log (Step S5). Specifically, the history processor 274 obtains the current date and time as the operation date and time. The history processor 274 sets the operation type to "scrolling operation", and also sets the operation target to "search results list", "favorites list", or the like. Subsequently, the history processor 274 generates the operation log including the operation date and time, the operation type, the operation target, the identified scrolling direction and scrolling speed, and the scrolling distance of the scrolling that has just been performed. The history processor 274 stores the generated operation log in the operation history DB 22a. Then, the history processor 274 performs a scrolling speed determination process (Step S6). In the scrolling speed determination process, the automatic scrolling speed is determined. The scroll speed determination process is described in detail below. Next, the history processor 274 causes the process to proceed to Step S2.

In Step S7, the operation receiver 272 determines whether the detected user operation is an add-to-favorites operation on a search results list. Here, if the operation receiver 272 determines that the detected user operation is the add-to-favorites operation (YES in Step S7), the process proceeds to Step S8. On the other hand, if the operation receiver 272 determines that the detected user operation is not the add-to-favorites operation (NO in Step S7), the process proceeds to Step S9. In Step S8, the process-scroll controller 273 performs an addition process. In the addition process, a commercial item selected by the user is added to his or her favorites. The addition process is described in detail below. Next, the process-scroll controller 273 causes the process to proceed to Step S2.

In Step S9, the operation receiver 272 determines whether the detected user operation is a delete-from-favorites operation on the favorites list. Here, if the operation receiver 272 determines that the detected user operation is the delete-from-favorites operation (YES in Step S9), the process proceeds to Step S10. On the other hand, if the operation receiver 272 determines that the detected user operation is not the delete-from-favorites operation (NO in Step S9), the process proceeds to Step S11. In Step S10, the process-scroll controller 273 performs a deletion process. In the deletion process, a commercial item selected by the user is deleted from the favorites. The deletion process is described in detail below. Next, the process-scroll controller 273 causes the process to proceed to Step S2.

In Step S11, the operation receiver 272 determines whether the detected user operation is an undo operation for a delete-from-favorites operation on the favorites list. Here, if the operation receiver 272 determines that the detected user operation is the undo operation (YES in Step S11), the process proceeds to Step S12. On the other hand, if the operation receiver 272 determines that the detected user operation is not the undo operation (NO in Step S11), the process proceeds to Step S13. In Step S12, the process-scroll controller 273 performs an undo process. In the undo process, deletion of a commercial item from the favorites is undone. The undo process is described in detail below. Next, the process-scroll controller 273 causes the process to proceed to Step S2.

In Step S13, the process-scroll controller 273 performs a process corresponding to the details of the detected user operation. Subsequently, the operation receiver 272 determines whether the detected user operation is an operation to clear the simple information list from the screen (Step S14). Examples of the operation to clear the simple information list include an operation to display the detailed information of a commercial item and an operation to terminate the online marketplace application. Here, if the operation receiver 272 determines that the detected user operation is not the operation to clear the simple information list (NO in Step S14), the process proceeds to Step S2. On the other hand, if the operation receiver 272 determines that the detected user operation is the operation to clear the simple information list (YES in Step S14), the operation receiver 272 terminates the listing process.

Figure 9:
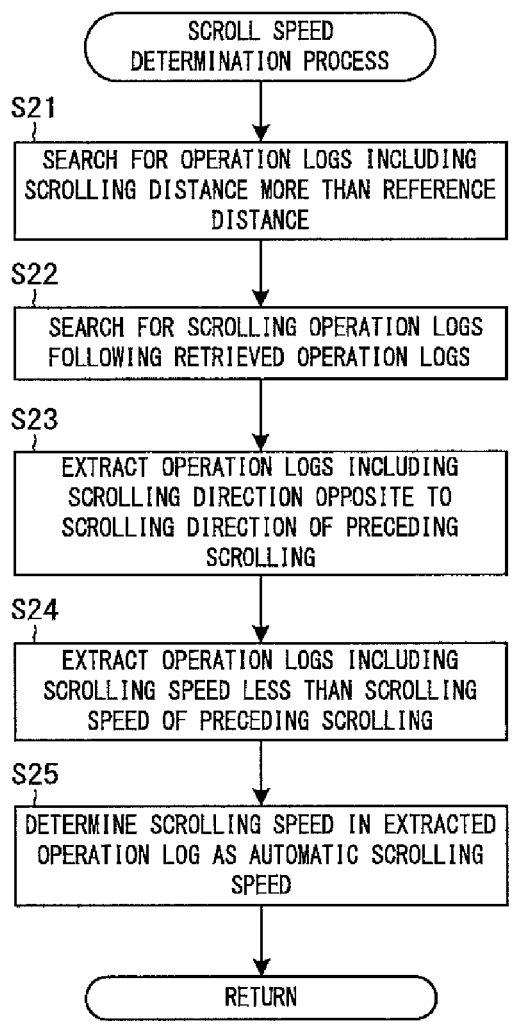
FIG. 9 is a flowchart showing an example process of a scrolling speed determination process in the system controller 27 of the user terminal 2 according to an embodiment.

FIG. 9 is a flowchart showing an example process of the scrolling speed determination process in the system controller 27 of the user terminal 2 according to this embodiment. As shown in FIG. 9, the history processor 274 searches the operation history DB 22a for scrolling operation logs including a scrolling distance more than the reference distance (Step S21). That is, the history processor 274 searches for the operation logs of candidates for the high-speed first scrolling. Subsequently, the history processor 274 searches the operation history DB 22a for the operation log of the scrolling that followed the scrolling indicated by each retrieved operation logs (Step S22). That is, the history processor 274 searches for the operation logs of candidates for the low-speed second scrolling. The sequence of operations can be identified based on the operation dates and times described in the operation logs stored in the operation history DB 22a. When scrolling being a candidate for the high-speed first scrolling was followed by an operation other than scrolling, the history processor 274 may determine that neither the high-speed first scrolling nor the low-speed second scrolling was performed. However, scrolling may be followed by a scrolling stop operation and then followed by scrolling. In such a case, the history processor 274 determines the scrolling that followed the scrolling stop operation as a candidate for the low-speed second scrolling.

Subsequently, from among the pairs of the retrieved operation logs of the candidates for the high-speed first scrolling and the corresponding candidates for the low-speed second scrolling, the history processor 274 extracts operation log pairs in which the scrolling direction of the candidate for the low-speed second scrolling is opposite to the scrolling direction of the candidate for the high-speed first scrolling (Step S23). Then, from among the operation log pairs extracted in Step S23, the history processor 274 extracts operation log pairs in which the candidate for the scrolling speed of the low-speed second scrolling is less than the candidate for the scrolling speed of the high-speed first scrolling (Step S24). Next, the history processor 274 determines the automatic scrolling speed based on the scrolling speeds described in the operation logs extracted in Step S24. For example, the history processor 274 may determine the scrolling speed of the low-speed second scrolling as the automatic scrolling speed, or determine the scrolling speed of the high-speed first scrolling as the automatic scrolling speed. When a plurality of pairs of the high-speed first scrolling and the low-speed second scrolling were performed, the history processor 274 may use, for example, the speed of the latest scrolling. Alternatively, for example, the history processor 274 may use the average or the median of a plurality of scrolling speeds. After Step S25, the history processor 274 terminates the scrolling speed determination process.

Figure 10:
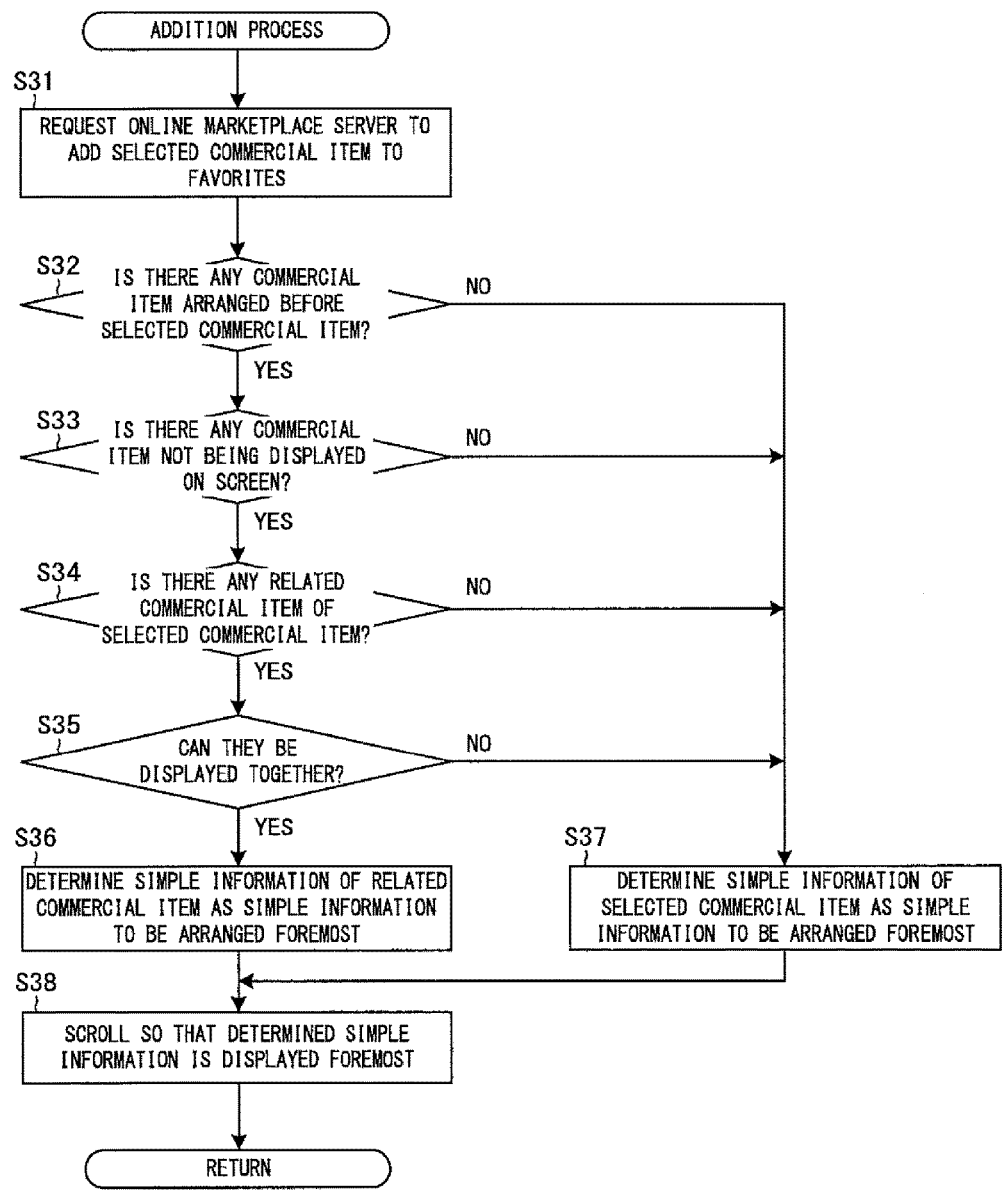
FIG. 10 is a flowchart showing an example process of an addition process in the system controller 27 of the user terminal 2 according to an embodiment.

FIG. 10 is a flowchart showing an example process of the addition process in the system controller 27 of the user terminal 2 according to this embodiment. As shown in FIG. 10, the process-scroll controller 273 sends, to the online marketplace server 1, an add-to-favorites request to add a commercial item selected by an add-to-favorites operation to the favorites (Send S31). Step S31 is the step corresponding to the add-to-favorites operation. Based on the add-to-favorites request, the online marketplace server 1 adds the favorite information of the selected commercial item to the favorite information DB 12c.

Subsequently, the process-scroll controller 273 determines whether there is any commercial item whose simple information is arranged before that of the selected commercial item, based on the information for listing received from the online marketplace server 1 (Step S32). Here, if the process-scroll controller 273 determines that there are commercial item(s) whose simple information is arranged before that of the selected commercial item (YES in Step S32), the process proceeds to Step S33. On the other hand, if the process-scroll controller 273 determines that there is no commercial item whose simple information is arranged before that of the selected commercial item (NO in Step S32), the process proceeds to Step S37.

In Step S33, the process-scroll controller 273 determines whether there is any commercial item whose simple information is not being displayed in the display area, among the commercial item(s) whose simple information is arranged before that of the selected commercial item. Here, if the process-scroll controller 273 determines that there are commercial item(s) whose simple information is not being displayed in the display area (YES in Step S33), the process proceeds to Step S34. On the other hand, if the process-scroll controller 273 determines that there is no commercial item whose simple information is not being displayed in the display area (NO in Step S33), the process proceeds to Step S37.

In Step S34, the process-scroll controller 273 determines whether there is any related commercial item of the selected commercial item, among the commercial item(s) whose simple information is not being displayed in the display area. An example of how to determine the related commercial item is now described. For example, assume that the information for listing includes the genre IDs of the commercial items. Based on the genre IDs, the process-scroll controller 273 determines whether there is any commercial item belonging to the same genre as the selected commercial item. If there is a commercial item belonging to the same genre as the selected commercial item, the process-scroll controller 273 determines that the commercial item belonging to the same genre is the related commercial item. How to determine the related commercial item is not limited to this example. Here, if the process-scroll controller 273 determines that there is a related commercial item of the selected commercial item (YES in Step S34), the process proceeds to Step S35. On the other hand, if the process-scroll controller 273 determines that there is no related commercial item of the selected commercial item (NO in Step S34), the process proceeds to Step S37.

In Step S35, the process-scroll controller 273 determines whether the simple information of the selected commercial item and the simple information of the related commercial item have a positional relationship that enables themselves to be displayed together in the display area. The vertical length of the display area is predetermined depending on the user terminal 2. The vertical length of each piece of simple information is also predetermined. Thus, the process-scroll controller 273 can determine whether they have a positional relationship that enables themselves to be displayed together, by calculating how far apart the simple information of the selected commercial item and the simple information of the related commercial item are arranged from each other. If the process-scroll controller 273 determines that they have a positional relationship that enables themselves to be displayed together (YES in Step S35), the process proceeds to Step S36. On the other hand, if the process-scroll controller 273 determines that they do not have any positional relationship that enables themselves to be displayed together (NO in Step S35), the process proceeds to Step S37.

In Step S36, the process-scroll controller 273 determines the simple information of the related commercial item as the simple information to be arranged foremost among the pieces of simple information displayed in the display area. Next, the process-scroll controller 273 causes the process to proceed to Step S38. In Step S37, the process-scroll controller 273 determines the selected simple information as the simple information to be arranged foremost among the pieces of simple information displayed in the display area. Next, the process-scroll controller 273 causes the process to proceed to Step S38.

In Step S38, the process-scroll controller 273 scrolls through the list so that the simple information determined in Step S37 or S38 is displayed foremost among the pieces of simple information displayed in the display area. At this time, the process-scroll controller 273 scrolls through the list at the scrolling speed determined in the scrolling speed determination process. Consequently, for example, the scrolling as shown in FIG. 2B or 2D is performed. After Step S38, the process-scroll controller 273 terminates the addition process.

Figure 11A:
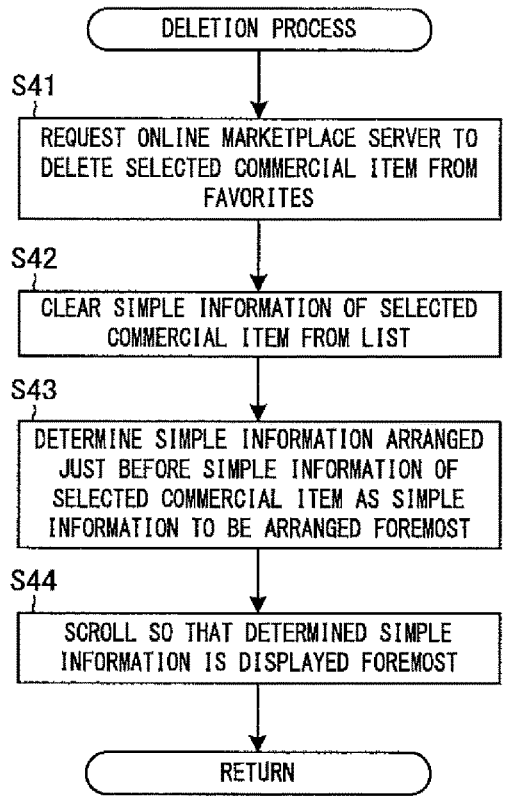
FIG. 11A is a flowchart showing an example process of a deletion process in the system controller 27 of the user terminal 2 according to an embodiment.

FIG. 11A is a flowchart showing an example process of the deletion process in the system controller 27 of the user terminal 2 according to this embodiment. As shown in FIG. 11A, the process-scroll controller 273 sends, to the online marketplace server 1, a delete-from-favorites request to delete a commercial item selected by a delete-from-favorites operation from the favorites (Send S41). Based on the delete-from-favorites request, the online marketplace server 1 deletes the favorite information of the selected commercial item from the favorite information DB 12c. Subsequently, the process-scroll controller 273 clears the simple information of the selected commercial item from the display area and causes the bar and the undo button to be displayed (Step S42). Steps S41 and S42 are the steps corresponding to the delete-from-favorites operation.

Subsequently, the process-scroll controller 273 identifies the commercial item whose simple information is arranged just before that of the selected commercial item in the list. Then, the process-scroll controller 273 determines the identified simple information as the simple information to be arranged foremost among the pieces of simple information displayed in the display area (Step S43). Next, the process-scroll controller 273 scrolls through the list so that the simple information determined in Step S43 is displayed foremost among the pieces of simple information displayed in the display area (Step S44). At this time, the process-scroll controller 273 scrolls through the list at the scrolling speed determined in the scrolling speed determination process. Consequently, for example, the scrolling as shown in FIG. 3B is performed. After Step S44, the process-scroll controller 273 terminates the deletion process.

Figure 11B:
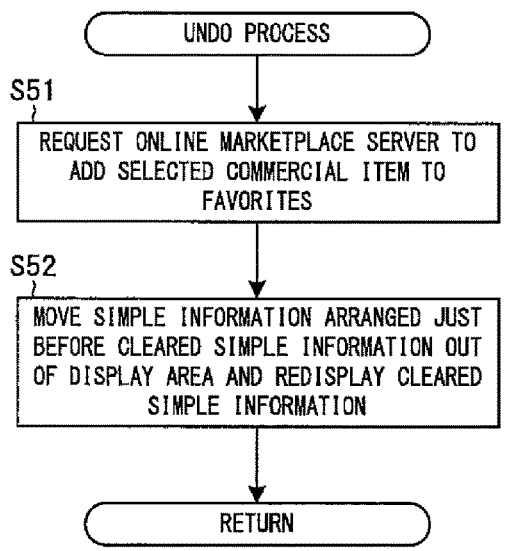
FIG. 11B is a flowchart showing an example process of an undo process in the system controller 27 of the user terminal 2 according to an embodiment.

FIG. 11B is a flowchart showing an example process of the undo process in the system controller 27 of the user terminal 2 according to this embodiment. As shown in FIG. 11B, the process-scroll controller 273 sends, to the online marketplace server 1, an add-to-favorites request to add a commercial item selected by an undo operation to the favorites again (Send S51). Based on the add-to-favorites request, the online marketplace server 1 adds the favorite information of the selected commercial item to the favorite information DB 12c.

Subsequently, the process-scroll controller 273 redisplays the simple information of the selected commercial item (Step S52). Specifically, the process-scroll controller 273 identifies the commercial item whose simple information is arranged just before that of the selected commercial item in the list. Then, the process-scroll controller 273 moves the simple information of the identified commercial item out of the display area. Subsequently, the process-scroll controller 273 clears the bar and the undo button from the display area, and displays the simple information of the selected commercial item. Consequently, for example, the display as shown in FIG. 3D is performed. After Step S52, the process-scroll controller 273 terminates the undo process.

As described above, according to this embodiment, the system controller 27 of the user terminal 2 causes some of a plurality of pieces of simple information to be listed in the display area on the display unit 23a. The system controller 27 also receives an operation to cause at least one piece of simple information not being displayed in the display area, among the plurality of pieces of simple information, to be displayed in the display area. The system controller 27 also receives an operation to select one piece of simple information from among the pieces of simple information displayed in the display area. Subsequently, the system controller 27 causes a predetermined process corresponding to an operation to be performed for simple information selected by the operation, and causes pieces of simple information to be arranged so that the selected simple information or the simple information arranged just before the selected simple information is the simple information arranged foremost among the pieces of simple information listed in the display area. Accordingly, this embodiment can reduce the burden on a user who performs an operation to display simple information not being displayed in the display area.

In addition, the system controller 27 receives a scrolling operation by the user, and causes scrolling to be performed so that the selected simple information or the simple information arranged just before the selected simple information is the simple information arranged foremost among the pieces of simple information listed in the display area. Consequently, this embodiment allows the user to easily recognize, by viewing how the scrolling is being performed, which simple information to first check after the scrolling.

Moreover, the system controller 27 determines whether there is any simple information related to the selected simple information, among pieces of simple information that are arranged before the selected simple information and are positioned outside the display area among the plurality of pieces of simple information. The system controller 27 also determines whether the selected simple information and the related simple information have a positional relationship that enables themselves to be displayed together in the display area. Then, if the system controller 27 determines that they have a positional relationship that enables themselves to be displayed together, the system controller 27 causes scrolling to be performed so that the related simple information is the simple information arranged foremost. Accordingly, when the user checks pieces of simple information arranged after the selected simple information, this embodiment can prevent the burden on the user who performs scrolling from increasing and reduce the burden on the user who performs an operation to display simple information not being displayed in the display area in order to check simple information that the user is likely to check.

In addition, the system controller 27 stores the scrolling operation logs of the user's scrolling operations in the storage unit 22. The system controller 27 also retrieves, from the storage unit 22, the logs of the high-speed first scrolling, which is performed over the reference distance, and the low-speed second scrolling, which is performed following the high-speed first scrolling in the direction opposite to the direction of the high-speed first scrolling at a speed less than the speed of the high-speed first scrolling. Then, the system controller 27 causes scrolling to be performed at the scrolling speed of any of the high-speed first scrolling and the low-speed second scrolling identified from the retrieved logs. Consequently, scrolling can be performed at a speed appropriate for the user.

Moreover, when a delete-from-favorites operation is received, the system controller 27 causes scrolling to be performed so that the simple information arranged just before the selected simple information is the simple information arranged foremost. When an add-to-favorites operation, different from a delete-from-favorites operation, is received, the system controller 27 causes scrolling to be performed so that the selected simple information is the simple information arranged foremost. Consequently, even if the selected simple information is cleared, the user can recognize how much scrolling has been performed.

Furthermore, when the simple information arranged just before simple information selected by a delete-from-favorites operation is displayed foremost, and then an operation to undo the delete-from-favorites operation is received, the system controller 27 moves the simple information arranged just before the cleared simple information out of the display area and redisplays the cleared simple information so as not to change the display positions of the other pieces of simple information positioned within the display area. Accordingly, this embodiment can reduce the burden on the user who performs an operation to scroll through the list in order to check simple information that the user is likely to check.

In the embodiment described above, the user terminal 2 performs scrolling as an example of a process for arranging pieces of simple information in the display area. However, the user terminal 2 may perform a process other than scrolling. The user terminal 2 only needs to arrange the pieces of simple information in the display area so that the selected simple information or the simple information arranged just before the selected simple information is displayed foremost in the display area. For example, assume that when the pieces of simple information of the commercial items 001 to 006 are being displayed in the display area, the user selects the simple information of the commercial item 003. At this time, for example, the user terminal 2 displays, by animation, how each of the pieces of simple information of the commercial items 001 to 003 is moving out of the display area. The moving direction of the simple information of the commercial item 001 may be different from or the same as the moving direction of the simple information of the commercial item 003. The user terminal 2 also displays the simple information of the commercial item 002 at the top of the display area. At this time, the user terminal 2 may display, by animation, the simple information of the commercial item 002 so that the simple information moves to the top of the display area while gradually getting smaller. Then, the user terminal 2 displays the pieces of simple information of the commercial items 004 to 008 below the simple information of the commercial item 002.

In the embodiment described above, the user terminal 2 receives a scrolling operation as an example of an operation to cause at least one piece of simple information not being displayed in the display area, among the plurality of pieces of simple information, to be displayed in the display area. However, the user terminal 2 may receive an operation other than a scrolling operation. For example, the user terminal 2 may receive an operation to move through list pages. For example, when the pieces of simple information of the commercial items 001 to 005 are being displayed as a list for the first page in the display area, the user performs an operation to select "Next". Then, the user terminal 2 displays the pieces of simple information of the commercial items 006 to 010 as a list for the second page.

In the embodiment described above, the user terminal 2 displays a simple information list, receives operations, and performs scrolling using dedicated application software. However, the user terminal 2 may use, for example, application software such as a web browser. For example, the user terminal 2 may receive an HTML document from the online marketplace server 1 and display a simple information list based on the HTML document. The user terminal 2 may receive operations and perform scrolling by executing a script embedded in the HTML document.

In the embodiment described above, an information processing apparatus according to the present invention is implemented on a terminal device. However, the information processing apparatus according to the present invention may be implemented on a server device, such as the online marketplace server 1. The server device may cause a terminal device to display a list and perform scrolling. For example, in response to a request from the user terminal 2, the online marketplace server 1 sends information for listing to the user terminal 2. The online marketplace server 1 thus causes the user terminal 2 to display a simple information list. When the user operates the user terminal 2, the user terminal 2 sends an operation notification indicating details of the operation to the online marketplace server 1. The online marketplace server 1 receives the user operation by receiving the operation notification. The online marketplace server 1 may register an operation log based on the operation notification. In this case, the operation history DB 22a is created in the storage unit 12 of the online marketplace server 1. The online marketplace server 1 determines the automatic scrolling speed based on the operation logs stored in the operation history DE 22a. The online marketplace server 1 also identifies, for example, the type of the operation based on the operation notification. When an add-to-favorites operation, a delete-from-favorites operation, an undo operation, or the like is performed, the online marketplace server 1 identifies a commercial item selected by the user based on the operation notification. The online marketplace server 1 performs a process corresponding to the user operation for the selected commercial item. For example, the online marketplace server 1 stores favorite information in the favorite information DB 12c and deletes favorite information. The online marketplace server 1 also performs a process for causing the user terminal 2 to perform the automatic scrolling. For example, the online marketplace server 1 determines a commercial item whose simple information is arranged foremost in the display area, based on the information for listing. The online marketplace server 1 then sends a scrolling instruction to the user terminal 2. The scrolling instruction includes, for example, the item ID of the determined commercial item and the automatic scrolling speed. The user terminal 2 performs scrolling so that the simple information of the commercial item indicated by the item ID included in the scrolling instruction is arranged foremost.

In the embodiment described above, a list of the present invention is represented by a commercial item information list. However, the list of the present invention can be a list of any information other than commercial item information. For example, the list of the present invention may be a list of e-mails on e-mail software. Examples of e-mails related to an e-mail include e-mails with the same tag or flag and reply e-mails.

REFERENCE SIGNS LIST 1 online marketplace server
11 communication unit
12 storage unit
12a member information DB
12b commercial item information DB
12c favorite information DB
13 input/output interface
14 system controller
14a CPU
14b ROM
14c RAM
15 system bus
2 user terminal
21 communication unit
22 storage unit
22a operation history DB
23 touch screen
23a display unit
23b position detector
24 speaker
25 microphone
26 input/output interface
27 system controller
27a CPU
27b ROM
27c RAM
271 listing processor
272 operation receiver
273 process-scroll controller
274 history processor
28 system bus
NW network
S information processing system

The invention claimed is:
1. An information processing apparatus comprising:
at least one memory configured to store program code; and
at least one processor coupled to said memory, wherein execution of the program code by the at least one processor causes the information processing apparatus to:
list a plurality of items arranged in a predetermined order in a display area on a display;
receive an operation from a user to select a first item of the plurality of items, wherein the operation corresponds to an add-to-favorites operation;
identify a second item, wherein the second item is related to the first item, the second item being among items arranged before a first item among the plurality of items and the second item being positioned outside the display area,
when the first item and the second item have a positional relationship that enables the first item and the second item to be displayed together in the display area:
perform, automatically by the at least one processor, scrolling of the list in a manner to: i) keep a distance between the first item and items originally arranged after the first item among the plurality of items unchanged, and ii) arrange the second item to be the item arranged foremost, and
when the first item and the second items do not have a positional relationship that enables the first item and the second item to be displayed together in the display area:
arrange the first item foremost in the display area while not displaying the second item in the display area.
2. The information processing apparatus according to claim 1, wherein execution of the program code by the at least one processor causes the information processing apparatus to:
store, in a storage, logs of scrolling performed according to operations to cause at least one of items not being displayed in the display area, among the plurality of items, to be displayed in the display area;
retrieve, from the storage, logs of first scrolling and second scrolling, the first scrolling being performed over more than a predetermined amount, the second scrolling being performed following the first scrolling in a direction opposite to a direction of the first scrolling at a speed less than a speed of the first scrolling; and
perform at a scrolling speed of any of the first scrolling and the second scrolling identified from the logs retrieved.
3. The information processing apparatus of claim 1, wherein the operation to select the first item corresponds to the user flicking the first item to a right direction in the display area.

4. The information processing apparatus of claim 1, wherein the first item is a commercial item.

5. An information processing method performed by a computer, the method comprising:
- listing a plurality of items arranged in a predetermined order in a display area on a display;
- receiving an operation from a user to select a first item of the plurality of items, wherein the operation corresponds to an add-to-favorites operation;
- identifying a second item, wherein the second item is related to the first item, the second item being among items arranged before a first item among the plurality of items and the second item being positioned outside the display area;
- when the first item and the second items have a positional relationship that enables the first item and the second item to be displayed together in the display area:
  - performing scrolling of the list automatically by the computer in a manner to: i) keep a distance between the first item and items originally arranged after the first item among the plurality of items unchanged, and ii) arrange the second item to be the item arranged foremost; and
- when the first item and the second item do not have a positional relationship that enables the first item and the second item to be displayed together in the display area:
  - arranging the first item foremost in the display area while not displaying the second item in the display area.

6. The method of claim 5, wherein the operation to select the first item corresponds to the user flicking the first item to a right direction in the display area.

7. The method of claim 6, further comprising:
- receiving a tap from the user on the first item; and
- displaying, in the display area, details of the first item.

8. The method of claim 5, wherein the first item is a commercial item.

9. The method of claim 5, further comprising:
- after the receiving the operation, requesting an online marketplace server to add the first item to a favorites list.

10. A non-transitory computer readable medium storing thereon an information processing program, the information processing program causing a computer to:
- list a plurality of items arranged in a predetermined order in a display area on a display;
- receive an operation from a user to select a first item of the plurality of items, wherein the operation corresponds to an add-to-favorites operation;
- identify a second item, wherein the second item is related to the first item, the second item being among items arranged before a first item among the plurality of items and the second item being positioned outside the display area;
- when the first item and the second item have a positional relationship that enables the first item and the second item to be displayed together in the display area:
  - perform, automatically by the information processing program, scrolling of the list in a manner to: i) keep a distance between the first item and items originally arranged after the first item among the plurality of items unchanged, and ii) arrange the second item to be the item arranged foremost; and
- when the first item and the second items do not have a positional relationship that enables the first item and the second item to be displayed together in the display area:
  - arrange the first item foremost in the display area while not displaying the second item in the display area.

11. The non-transitory computer readable medium of claim 10, wherein the operation to select the first item corresponds to the user flicking the first item to a right direction in the display area.

12. The non-transitory computer readable medium of claim 10, wherein the first item is a commercial item.

* * * * *